Figure 1:
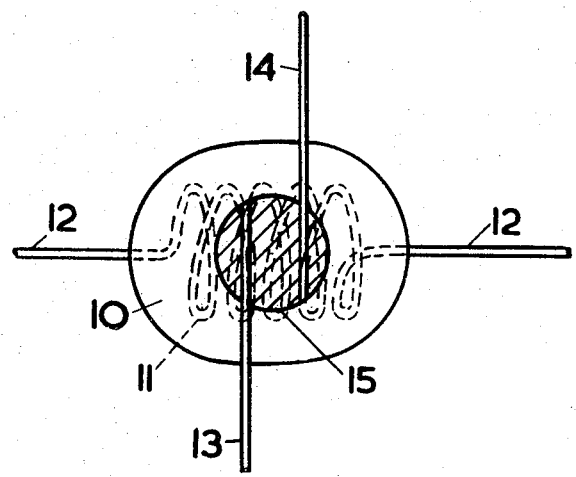

United States Patent [19]
Bott et al.

[11] 3,865,550
[45] Feb. 11, 1975

[54] SEMI-CONDUCTING GAS SENSITIVE DEVICES

[75] Inventors: Barry Bott, Dinnington; Jack Graham Firth, Chapeltown, near Sheffield; Alan Jones, Sheffield; Thomas Alwyn Jones, Dronfield, near Sheffield, all of England

[73] Assignee: National Research Development Corporation, London, England

[22] Filed: Oct. 25, 1973

[21] Appl. No.: 409,453

Related U.S. Application Data
[63] Continuation-in-part of Ser. No. 174,910, Aug. 25, 1971, abandoned.

[30] Foreign Application Priority Data
Mar. 30, 1973 Great Britain............... 15577/73
Aug. 26, 1970 Great Britain............... 41061/70

[52] U.S. Cl. ............ 23/232 E, 23/254 E, 29/576, 73/23, 307/304, 317/238, 324/71 SN, 338/13, 338/22 SD
[51] Int. Cl.... G01n 27/00, G01n 31/00, H01c 7/00
[58] Field of Search........... 23/254 E, 255 E, 232 E, 23/232 R, 254 R; 324/71 SN; 338/13, 34, 22 SD; 73/23, 27 R; 317/238; 307/304; 29/576 (U.S. only), 570 (U.S. only), 589

[56] References Cited
UNITED STATES PATENTS

| | | | |
|---|---|---|---|
| 3,036,895 | 5/1962 | Cole................................ | 23/232 E |
| 3,255,324 | 6/1966 | Ovshinsky...................... | 324/71 SN |
| 3,340,014 | 9/1967 | Neal et al........................ | 23/254 E |
| 3,479,257 | 11/1969 | Shaver............................ | 23/254 E X |
| 3,558,280 | 1/1971 | Panson et al.................... | 23/254 E |
| 3,567,383 | 3/1971 | Langley et al.................. | 23/254 E X |
| 3,598,762 | 8/1971 | Futaki et al.................... | 29/576 UX |
| 3,631,436 | 12/1971 | Taguchi.......................... | 23/254 E X |
| 3,676,820 | 7/1972 | Taguchi.......................... | 23/254 E X |

Primary Examiner—Joseph Scovronek
Attorney, Agent, or Firm—Cushman, Darby & Cushman

[57] ABSTRACT

An activated semiconducting element comprises a semiconducting oxide of a first metal with at least one further metal incorporated in its lattice system whereby the semiconductivity of the activated oxide alters in the presence of a gas to be detected, which may be at a low concentration in an atmosphere consisting largely of another gas. The first metal and the further metal can be chosen so that the activated semiconducting element is reactive to a chosen gas or group of gases. The activated element is usually prepared in a porous form by deposition from a molten solvent and is heated to a temperature of maximum sensitivity.

35 Claims, 3 Drawing Figures

PATENTED FEB 1 1 1975  3,865,550

SEMI-CONDUCTING GAS SENSITIVE DEVICES

This is a continuation-in-Part of our application Ser. No. 174 910 filed on Aug. 25 1971, and now abandoned.

The present invention relates to gas-sensitive devices which can detect and/or measure the presence of a gas, and to their preparation in a desirable physical form.

It is known that changes can be produced in the electrical conductivity of many semiconducting metal oxides by the adsorption or reaction of gases on their surfaces, and such changes can be used for the purpose of detecting gases. The present invention is based on the discovery that the sensitivity of a particular metal oxide towards particular gases can be considerably enhanced by the deliberate incorporation of appropriate metals into the lattice system of the oxide. By this means it has been found possible to produce a highly sensitive device for detecting the presence of a gas even in the presence of other gases and which does not give anomalous readings.

According to the invention in its broadest aspect, a gas-sensitive device comprises a semi-conducting element having a surface which can be exposed to an atmosphere containing the gas to which the device is sensitive, and two electrodes separately in contact with the semiconducting element whereby an electric current can be passed between the electrodes which is dependent upon the conductivity of the element, the element comprising a semi-conducting oxide of a first metal having within its lattice system at least one further metal whereby the system is activated by being caused to contain a higher concentration than the unactivated semiconducting oxide of at least one metallic ionic species which reacts more strongly within a given temperature range to the presence of the gas to be detected than the predominant metallic ionic species of the unactivated semiconducting oxide, with the result that the conductivity of the device is highly dependent within the given temperature range on the concentration of the gas in the atmosphere.

The metallic ionic species which reacts more strongly to the presence of the gas may be ions of the further metal or metals, which will then be referred to as a primary activator or activators. Alternatively this metallic ionic species may be ions of the first metal which are active in the presence of the further metal or metals, which will then be referred to as a secondary activator or activators. In other cases, as well as a primary activator further metal, a second further metal may be added which will also be called a secondary activator as it similarly controls the concentration of the active ionic species which in this case is provided by the primary activator.

The further metal activator or activators reside either interstitially or substitutionally within the lattice system, that is, in solid solution, and are normally added in proportions between 0.01 and about 3 atomic percent, generally about 2 atomic percent. All percentage values given in the specification and claims are atomic percentage values. Preferably substitutional activators are of a similar size to that of the ions of the lattice metal.

Usually a secondary activating metal has a relatively definite level of ionic charge, that is one relatively stable oxidation state, which differs from that of the predominant metallic ionic species of the unactivated semiconducting oxide in an opposite sense to that of the desired reactive ionic species. Thus a secondary activator of low oxidation state having relatively few units of charge per ion is normally added if a reactive ionic species of high oxidation state having a higher number of units of charge per ion is required, and vice versa. In practice, a secondary activator will be a member of a different group of the Periodic Table from that of the metal which is the reactive ionic species.

Generally, oxidation states of metal ions which are lower than normal, or the lower or lowest of two or three common or normal oxidation states are reactive to acidic and oxidising gases such as sulphur dioxide, hydrogen chloride and ozone, and also favour dissociative absorption of reducing gases such as hydrocarbons and carbon monoxide. Oxidation states of metal ions which are higher than normal states or higher than other normal states, are reactive to basic gases such as ammonia. The reactive ionic species can therefore be chosen to be sensitive to the type of gas to be detected.

It is important to be able to prepare the semiconducting element in a form which gives reproducible physical, electrical and chemical characteristics both from a single specimen and between similar specimens. The element should also have a relatively large exposable surface area and long service life.

The present invention also aims to provide highly sensitive semi-conducting gas-sensitive devices having such desirable physical properties and it has been found that this may be achieved by providing the semi-conducting element in a form which has a porous structure so that a large surface area can be exposed to the atmosphere.

Preferably the element is in the form of substantially uniformly sized, rounded particles, sintered or partially fused together, and preferably the particles are virtually spherical particles of the order of one micron in diameter, made by deposition from molten ammonium nitrate, molten ammonium formate or like molten ionic solvent, and preferably the particles are sintered together after deposition by direct or indirect heatig.

This method of preparation enables the parent oxide lattice to be easily activated with a wide range of foreign ions without the usual necessity of heating to a high temperature, ie greater than the Tamman temperature of the solid, thereby decreasing the surface area of the oxide.

In accordance with the invention a method of detecting the presence or measuring the concentration of a gas in an atmosphere comprises exposing to the atmosphere a surface of a semi-conducting element as above described whose electrical conductivity is dependent upon the concentration of the gas in the atmosphere and detecting or measuring changes in the conductivity of the exposed semi-conducting element.

In use, the gas-sensitive device is connected via the two electrodes to an electrical circuit arranged so that an electrical current can be passed through the device, and any changes in this current due to changes in the resistance of the device can be detected and, if desired, measured.

The sensitivity of the semi-conducting element is greater is greater within a temperature range which is dependent on the gas to be detected. Means are therefore provided to maintain the temperature of the activated metal oxide within said given temperature range of relatively high sensitivity, which is normally in excess of 150°C.

A semi-conducting element according to the invention can be conveniently mounted on a fused glass bead and a heating element may be fused into the glass, or alternatively the element can be mounted between two spaced conducting wires which can act as electrodes and also connect a source of heating current to the element.

A gas-sensitive device according to the invention is particularly useful for detecting the concentration of various reducing gases in the earth's atmosphere which consists predominantly of the inactive gases nitrogen and argon with a considerable concentration of the oxidising gas, oxygen. Although it has previously been reported that the coductivity of a semi-conductor is changed when exposed to a gas instead of a vacuum, we believe it has not been previously discovered that the conductivity is changed in accordance with both increases and decreases in concentration of a reducing gas in the presence of an oxidising gas such as oxygen.

We have discovered thaat by the presence of further metals in the lattice system of the semi-conducting oxide the concentration of only a small amount of a reducing gas, such as methane or carbon monoxide in the ordinary atmosphere, can be accurately measured in spite of the presence of oxygen in a much higher concentration. We have further discovered that the gas-sensitive device can be made sensitive to the one gas or group of gases it is desired to detect and measure and be virtually unaffected by other gases by an appropriate choice of the activated metal oxide semi-conducting system.

More specifically, the lower valency or oxidation states of transition metals, in particular platinum, favour the adsorption of reducing gases such as hydrocarbons. Therefore the presence of low oxidation states of transition metal ions in the lattice of an oxide whose conductivity is normally not greatly affected by reducing gas, will markedly increase the effects of these gases. In order to obtain the required low oxidation state of the incorporated primary activator ion, it is important to have a metal ion normally present in the oxide lattice which is capable of reducing the higher oxidation states of the incorporated primary activator ion. For example, the zinc oxide lattice normally has ions present in it which can be designated $Zn^+$ or $Zn^o$. These ions are capable of reducing incorporated primary activator platinum ions such as $Pt^{2+}$ to a lower oxidation state such as $Pt^o$. For example the reaction with $Zn^o$ can be denoted:

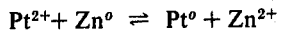

$$Pt^{2+} + Zn^o \rightleftharpoons Pt^o + Zn^{2+}$$

For example, if an element comprising a pellet consisting substantially of zinc oxide containing up to 3% of platinum, for example 2%, is maintained at a temperature of at least 500°C e.g. 600°C, and is exposed to a mixture of 3% methane in air, the conductivity of the element changes by a factor of more than 2. If the element is now exposed to air containing substantially no methane, the conductivity of the element returns to its original value. Such a change in conductivity is greater by a factor of 4 over the change in conductivity of a similar zinc oxide element containing substantially no platinum.

The concentration of transition metal ions in the lower oxidation state can be increased by increasing the concentration of the reducing ion normally present in the lattice. This can be achieved by introducing into the lattice as a secondary activator a second foreign ion having a higher normal oxidation state and so having a higher charge than those present normally in the lattice. Thus in the example of a zinc oxide element described above, the incoporation as a secondary activator of up to 3% gallium ions $Ga^{3+}$ into the lattice increases the concentration of $Zn^o$ or $Zn^+$ in the lattice which are in turn able to reduce more of the $Pt^{2+}$ ion which has been introduced into the lattice as the primary activator. As a result the sensitivity to methane in concentrations of the order of 1% in air will be improved.

Reducing gases such as carbon monoxide and hydrocarbon gases will also produce changes in the electrical conductivity of systems having transition metal oxide lattices when held at suitable elevated temperatures. The size of their effect can be markedly increased in transition metal oxides containing doubly charged metal ions by the addition, as a secondary activator, of small amounts of triply charged ions. For example the addition of up to 3% of gallium to nickel oxide markedly increases the conductivity change produced by 100 ppm of carbon monoxide in air when the activated oxide is maintained at a temperature of at least 300°C. The $Ga^{3+}$ ion is not itself active in the adsorption of the reducing gas but it promotes the formation of lower oxidation states of the transition metal ions such as $Ni^+$ or $Ni^o$ in nickel oxide which are active in the adsorption of reducing gases.

Basic gases such as ammonia can also be detected by their effect on the conductivity of a metal oxide. Ions in a higher than normal or an appropriate higher oxidation state are sensitive to basic gases and can be introduced into a semi-conducting element by incorporating as a primary activator a metal ion which is oxidised by one of the ions normally present in the oxide lattice of the element. Thus interaction of the electrons of the basic gas with the higher oxidation state of the primary activator affects the conductivity of the oxide through the oxidising ion normally present in the lattice. For example, if up to 3% of tin is added as a primary activator to a ferrous oxide lattice, then the $Fe^{3+}$ ions present in the lattice change some $Sn^{2+}$ ions to $Sn^{4+}$ ions, and the latter are sensitive to basic gases when held at a temperature of at least 150°C. The effect is enhanced by addition of up to 3% of $Li^+$ as a secondary activator when the concentration of $Fe^{3+}$ is increased so the concentration of $Sn^{4+}$ increases.

The higher oxidation states of metal ions can also be produced by addition of an ion which will promote the formation of higher oxidation states of th metal ions of a metal oxide lattice; the adsorption of a basic gas such as ammonia will be promoted whereby the conductivity of the element will be changed. For example, the addition as a secondary activator of up to 3% of singly charged ions such as $Li^+$ to a lattice of doubly charged ions such as $Sn^{2+}$ will increase the concentration of higher charged states of ions such as $Sn^{4+}$ and thereby increase the effect of basic gases on the conductivity.

By using the reducing action of a metal ion normally present in the lattice on a foreign ion incorporated into the lattice as a primary activator to produce a lower oxidation state of this foreign ion, the effects of acidic and oxidising gases on the semi-conductivity of a metal oxide can be promoted. For example, the addition of up to 3% of thallium as a primary activator to a ferric oxide lattice causes the $Fe^{2+}$ ion to reduce $Tl^{3+}$ ions to $Tl^+$ ions, and the latter are sensitive to acidic and oxidising gases when held at a temperature of at least 150°C. The effect is enhanced by the addition of up to 3% of cerium as a secondary activator, since the $Ce^{4+}$ ions increase the concentration of $Fe^{2+}$ ions and hence of $Tl^+$ ions.

The adsorption of acidic and oxidising gases on a particular oxide can also be promoted by the presence of lower oxidation states of the metal ions of the lattice. Thus the addition of up to 3% of a triply charged ion such as $Ga^{3+}$ as a secondary activator to an oxide lattice of doubly charged or singly charged ions such as silver oxide will promote the formation of lower charged ions such as $Ag^o$ which will increase the effect of acidic gases on the conductivity of the oxide at a temperature of at least 150°C.

Another semiconducting metal oxide which may be used in devices according to the invention is uranium oxide ($UO_2$), in which the metals iridium, palladium and platinum may be used as primary activators in concentrations between 0.01 and 0.5%. Thus in one example the device may comprise uranium oxide containing about 0.3% of iridium. Such a device would be sensitive at 350°C to low concentrations of carbon monoxide, eg 0–100ppm, and would also be sensitive to concentrations of hydrocarbons approaching the explosive range, eg 1% volume/volume of methane. Such a device could be used to detect leaks from heaters fired by natural gas or liquefied petroleum gas; such leakages could give rise to an explosion hazard, or to a toxic hazard from carbon monoxide if combustion was inefficient. In another example, a device may comprise uranium oxide containing about 0.3% palladium as an activator and up to 1.0%, for example 0.7%, of either manganese or cerium. At 450°C, such a device is sensitive to carbon monoxide at concentrations up to about 100 ppm, even in the presence of up to about 10,000 ppm of a hydrocarbon such as methane. The effect of the hydrocarbon on the device is suppressed by the manganese or cerium, which do not comprise activators. Such a detector could be used for detection purposes.

In yet another example, a device may comprise uranium oxide containing about 0.3% platinum. At 400°C such a device is sensitive to hydrocarbons at concentrations of the order of 10,000 ppm, but is unaffected by carbon monoxide at a concentration of the order of 100 ppm. Such a device could be used to measure the concentration of unburnt fuel in flue gases.

A typical preparation of an activated semiconducting gas sensitive element will now be described.

A metal oxide such as ZnO is mixed with a salt of an activating metal; eg if the activating metal is platinum, then a suitable salt is ammonium chloro-platinate. The proportion of activating metal salt to metal oxide is calculated to give the desired percentage of activating metal in the mixture. The metal oxide — metal salt mixture is suspended in an aqueous solution of an ionic salt, for example, ammonium nitrate which becomes molten on heating, so that the mole ratio of oxide to ammonium nitrate or other ionic salt is less than 1. The suspension is then heated to evaporate the water and give a melt which is cooled; the cooled, solidified melt is ground to a powder which is resuspended in water. This method converts the oxide to the metal ammine complex and results in a fine suspension of the metal ammine complex in an aqueous solution of the residual ammonium nitrate. An appropriate amount of this suspension is then used to form the semi-conducting element of a gas-sensing device by placing it between the two electrodes and heating it to a final temperature of 200°–400°C.

This results successively in the evaporation of water from the suspension, the formation of molten ammonium nitrate, the dissolution of the particles of the metal ammine in the ammonium nitrate melt, the decomposition of the ammonium nitrate into nitrous oxide and water which results in the complete removal of ammonium nitrate and the deposition of the activated metal oxide into particles of uniform size. The size of the particles can be varied by changing the rate of their deposition, ie by changing the temperature at which the ammonium nitrate is decomposed; the higher the temperature, the smaller the particle size. The resulting material has a uniform particle size and high surface area.

Alternatively the metal oxide and the metal salt may each be suspended in aqueous ammonium nitrate solution and appropriate quantities of the suspensions mixed to give a desired percentage of activating metal, and the procedure described above may then be followed.

For gases, such as reducing gases, which change the number of charge carriers in the metal oxide, it is necessary to remove the touch contacts between particles and produce material in which the oxide particles are partially sintered together. This can be achieved by the conventional method of heating the oxide to a high temperature by indirect heating. However, a more satisfactory method is to heat the oxide by passing an electric current through it. In this way the heat is produced at the particle-particle contacts and sintering occurs preferentially at these sites thus producing the desired form of oxide.

Figure 2A:
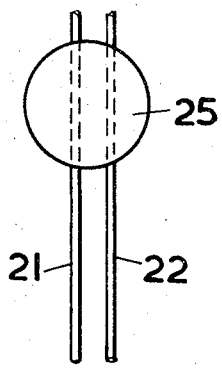
Figure 2B:
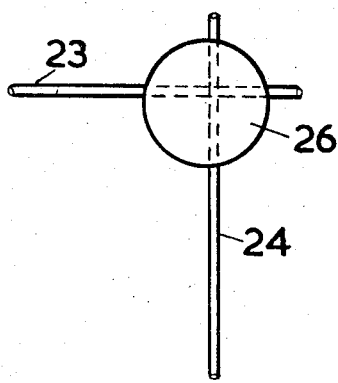

In gas detecting instruments for field use it is desirable to minimise power consumption; the transducer which converts the gas concentration into a measurable signal should therefore be as small as possible. Two methods have been developed for using metal oxides in transducers and are illustrated in FIGS. 1, 2a and 2b. In FIG. 1, a small glass bead 10 containing a heating coil 11 is produced by coating a small coil of noble metal wire with a slurry of powdered glass in glycerol. The coated coil is heated by passing an electric current through the coil via electrical conductors 12 to evaporate the glycerol. The temperature of the coil is then raised above the melting point of the glass to produce the fused glass bead 10. A typical coil 11 is one of platinum — 40% rhodium alloy wire (0.025-mm diameter) with 6 turns of pitch 0.05 mm and diamter 0.25 mm and a typical glass is one containing 82.8% $SiO_2$, 5% $Al_2O_3$, 11.8% $B_2O_3$ and 0.4% BaO. An alternative way of forming the bead is to dip the coil into the molten glass contained in a crucible. The glass bead 10 is then heated above the softening point of the glass and two pieces of metal wire 13, 14 are embedded in the glass which is then cooled. The two wires 13, 14 act as electrodes for the activated metal oxide 15 which is deposited on the glass bead 10 between the wires 13, 14. The activated metal oxide 15 can be deposited from ammonium nitrate solution and can be treated as already described to obtain it in any desired form. In use the oxide 15 is heated to the required temperature by means of the coil 11 within the bead 10 and the electrical resistance of the oxide 15 is measured by using the electrodes 13, 14 fused into the glass bead 10.

A second method of using an activated metal oxide is to produce a small bead of the oxide between two metal wires as illustrated in FIG. 2a, 2b. A transducer of this form has the advantage of using less power than the glass bead. Two wires 21, 22 or 23, 24 typically platinum or platinum — 40% rhodium, 0.025 mm in diameter, are positioned close to each other, typically 0.05 mm apart. The wires can be either parallel as in FIG. 2a or normal to each other as in FIG. 2b. A bead 25, 26 of activated metal oxide is formed between them from a drop of ammonium nitrate solution. The solution is evaporated and decomposed by electrically heating one or both of the wires 21, 22 or 23, 24. The resulting oxide bead 25, 26 is then treated in one of the manners already described to produce an activated oxide with the desired characteristics. In use the activated oxide 25, 26 is heated to the required temperature by passing an electric current directly through it using the metal wires 21, 22 or 23, 24 as electrodes. The electrical resistance of the oxide in a gas atmosphere is measured directly from the heating current.

It is an advantage of small activated metal oxide elements produced by the methods described above that only low power is needed to maintain them at elevated temperatures. In addition, large current changes are produced in comparison with the previously used catalytic type of gas detector described in U.S. Pat. No. 3,092,799. Such devices may therefore be used with battery power sources and simple electrical detecting circuits and are consequently suitable for field use.

By suitable choice of the metal oxide and of primary and secondary activators, detecting elements may be produced which will detect either very small concentrations of a gas, such as a few parts per million, or large concentrations of a gas, up to 100%. For the latter use, a system must be chosen which has a monotonic reaction with no maxima or minima throughout the whole range of gas concentration.

We claim:

1. A gas-sensitive device comprising a semi-conducting element having a surface which can be exposed to an atmosphere containing the gas to which the device is sensitive and two electrodes separately in contact with the semi-conducting element whereby an electric current can be passed between the electrodes which is dependent upon the conductivity of the element, the element consisting essentially of a semi-conducting oxide of a first metal having in solid solution within its lattice system at least one further metal which constitutes an activator promoting in the system at least one metallic ionic species which reacts more strongly within a given temperature range to the presence of the gas to be detected than the predominant metallic ionic species of the unactivated semiconducting oxide, said at least one further metal being present in an activating amount, with the result that the conductivity of the element is highly dependent within the given temperature range on the concentration of the gas to be detected in the atmosphere.

2. A gas-sensitive device according to claim 1 having means to maintain the temperature of the activated metal oxide within said given temperature range of relatively high sensitivity.

3. A gas-sensitive device according to claim 1 in which the semi-conducting element has a porous structure.

4. A gas-sensitive device according to claim 1 in which the semi-conducting element is in the form of substantially uniformly sized rounded particles sintered together.

5. A gas-sensitive device according to claim 4 in which the particles are virtually spherical particles of the order of one micron in diameter.

6. A gas-sensitive device according to claim 1 mounted on a glass bead with a heating element fused into the glass.

7. A gas-sensitive device according to claim 1 and wherein the device is mounted on the two electrodes.

8. A method of producing a gas-sensitive device having a semi-conducting element consisting essentially of a semi-conducting metal oxide having in solid solution whithin its lattice system at least one furter metal which constitutes an activator promoting in the system at least one ionic species which reacts more strongly within a given temperature range to the presence of the gas to be detected than the predominant metallic ionic species of the unactivated semi-conducting oxide, which method compises positioning two electrodes, heating in an ionic salt complexes of the said metal oxide and the at least one further metal to produce between the two electrodes a molten body in which said complexes are substantially dissolved, and evaporating the melt to leave a deposition of particles of the semi-conducting element between the two electrodes.

9. A method according to claim 8 wherein the ionic salt is an ammonium salt and the complexes of the metal oxide and the at least one further metal are ammine complexes.

10. A method according to claim 8 wherein the ionic salt is ammonium nitrate.

11. A method of producing a gas-sensitive device having a semi-conducting element consisting essentially of a semi-conducting metal oxide having in solid solution within its lattice system at least one further metal which constitutes an activator promoting in the system at least one ionic species which reacts more strongly within a given temperature range to the presence of the gas to be detected than the predominant metallic ionic species of the unactivated semi-conducting oxide, which method comprises positioning two electrodes, preparing a suspension in an aqueous ionic salt of a mixture of the metal oxide and a salt of the at least one further metal to give a desired concentration with respect to the metal oxide of the at least one further metal and to give a mole ratio of the oxide to the ionic salt of less than one, placing the sus pension between the two electrodes, heating the suspension to produce a molten body in which the complexes of the metal oxide and the at least one further metal are substantially dissolved, and evaporating the melt to leasve a deposition of particles of the semi-conducting element between the two electrodes.

12. A method according to claim 11 in which the ionic salt is an ammonium salt and the complexes of the metal oxide and the at least one further metal are ammine complexes.

13. A method according to claim 11 in which the ionic salt is ammomium nitrate and the melt is evaporated at a temperature between 200°C and 400°C.

14. A gas-sensitive device according to claim 1 wherein said at least one metallic ionic species is ions of said at least one further metal.

15. A gas-sensitive device according to claim 14 wherein the concentration of said at least one metallic ionic species is enhanced by the incorporation of a second further metal.

16. A gas-sensitive device according to claim 1 wherein said at least one metallic ionic species is ions of said first metal.

17. A gas-sensitive device according to claim 1 comprising a zinc oxide lattice containing up to 3 atomic percent of platinum and sensitive to hydrocarbons when held at a temperature of at least 500°C.

18. A gas-sensitive device according to claim 17 and cotaining up to 3 atomic percent of gallium.

19. A gas-sensitive device according to claim 1 comprising a ferrous oxide lattice containing up to 3 atomic percent of tin and which is sensitive to basic gases when held at a temperature of at least 150°C.

20. A gas-sensitive device according to claim 19 and containing up to 3 atomic percent lithium.

21. A gas-sensitive device according to claim 1 comprising a ferric oxide lattice containing up to 3 atomic percent thallium and which is sensitive to acidic and oxidising gases when held at a temperature of at least 150°C.

22. A gas-sensitive device according to claim 21 and containing up to 3 atomic percent cerium.

23. A gas-sensitive device according to claim 1 comprising a nickel oxide lattice containing up to 3 atomic percent gallium which when maintained at a temperature of at least 250°C is sensitive to reducing gases.

24. A gas-sensitive device according to claim 1 comprising a stannous oxide lattice containing up to 3 atomic percent lithium which when held at a temperature of at least 150°C is sensitive to basic gases.

25. A gas-sensitive device according to claim 1 comprising a silver oxide lattice containing up to 3 atomic percent gallium which when held at a temperature of at least 150°C is sensitive to acidic and oxidising gases.

26. A gas-sensitive device according to claim 1 comprising a uranium oxide lattice containing up to 0.5 atomic percent iridium and which when held at a temperature of at least 300°C is sensitive to low concentrations of carbon monoxide and of methane.

27. A gas-sensitive device according to claim 1 comprising a uranium oxide lattice containing up to 0.5 atomic percent palladium and up to 1.0 atomic percent manganese and which when held at a temperature of at least 400°C is sensitive to low concentrations of carbon monoxide even in the presence of a hydrocarbon.

28. A gas-sensitive device according to claim 1 comprising a uranium oxide lattice containing up to 0.5 atomic percent palladium and up to 1.0 atomic percent cerium and which when held at a temperature of at least 400°C is sensitive to low concentrations of carbon monoxide even in the presence of a hydrocarbon.

29. A gas-sensitive device according to claim 1 comprising a uranium oxide lattice containing up to 0.5 atomic percent platinum and which when held at a temperature of at least 350°C is sensitive to hydrocarbons at concentrations of the order 10,000 parts per million even in the presence of a low concentration of carbon monoxide.

30. A gas-sensitive device according to claim 1 in which the proportion of said further metal in the lattice system does not substantially exceed 3 atomic percent.

31. A gas-sensitive device according to claim 1 in which said first metal is selected from the group consisting of zinc, nickel, iron, tin and silver.

32. A gas-sensitive device according to claim 31 in which said further metal is selected from the group consisting of platinum, tin, thallium, gallium, lithium and cerium.

33. A gas-sensitive device according to claim 1 in which said first metal is uranium.

34. A gas-sensitive device according to claim 33 in which said further metal is selected from the group consisting of iridium, palladium and platinum.

35. A method of detecting a gas in an atmosphere comprising:
   exposing to said atmosphere a semiconducting element consisting essentially of a semiconducting oxide of a first metal having in solid solution within its lattice system at least one further metal which constitutes an activator promoting in the system at least one metallic ionic species which reacts more strongly within a given temperature range to the presence of said gas than the predominant metallic ionic species of the unactivated semi-conducting oxide, said at least on further metal being present in an activating amount;
   maintaining said semiconducting element within said given temperature range; and
   detecting changes in the conductivity of said semiconducting element while it is exposed to said atmosphere and maintained within said given temperature range.

* * * * *

UNITED STATES PATENT OFFICE
CERTIFICATE OF CORRECTION

Patent No. 3,865,550  Dated February 11, 1975

Inventor(s) Barry Bott, Jack Graham Firth, Alan Jones and Thomas Alwyn Jones

It is certified that error appears in the above-identified patent and that said Letters Patent are hereby corrected as shown below:

Under the heading "Foreign Application Priority Data" insert:

```
August 26, 1970   Great Britain   41062/70
April  23, 1971   Great Britain   11001/71
April  23, 1971   Great Britain   11002/71
```

Column 2, line 64, delete "is greater" (second occurrence);

Column 3, line 22, correct the spelling of "that";

Column 4, line 53, correct the spelling of "the";

Column 8, line 19, correct the spelling of "further";

line 25, correct the spelling of "comprises";

line 57, correct the spelling of "leave".

Signed and Sealed this thirteenth Day of January 1976

[SEAL]

Attest:

RUTH C. MASON
Attesting Officer

C. MARSHALL DANN
Commissioner of Patents and Trademarks